(12) United States Patent
Wu et al.

(10) Patent No.: US 10,907,967 B1
(45) Date of Patent: Feb. 2, 2021

(54) RING LASER GYROSCOPES WITH ACTIVE VOLUME BRAGG GRATING

(71) Applicant: Honeywell International Inc., Morris Plains, NJ (US)

(72) Inventors: Jianfeng Wu, Tucson, AZ (US); Karl D. Nelson, Plymouth, MN (US); Teresa Marta, White Bear Lake, MN (US); Alan Bruce Touchberry, Saint Louis Park, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/591,484

(22) Filed: Oct. 2, 2019

(51) Int. Cl.
*G01C 19/66* (2006.01)

(52) U.S. Cl.
CPC .................. *G01C 19/661* (2013.01)

(58) Field of Classification Search
None
See application file for complete search history.

(56) References Cited

U.S. PATENT DOCUMENTS

| | | | |
|---|---|---|---|
| 7,298,771 B2 | 11/2007 | Volodin et al. | |
| 7,567,608 B2 | 7/2009 | Chung | |
| 9,001,862 B2 | 4/2015 | Ushinsky et al. | |
| 9,014,223 B2 | 4/2015 | Miesak | |
| 9,377,623 B2 | 6/2016 | Robbins et al. | |
| 9,574,880 B2 | 2/2017 | Khalil et al. | |
| 2008/0094636 A1* | 4/2008 | Jin | G01C 19/66 356/466 |
| 2013/0083327 A1* | 4/2013 | Khalil | G01C 19/661 356/460 |
| 2018/0358772 A1 | 12/2018 | Puckett et al. | |
| 2019/0067894 A1 | 2/2019 | Stephen | |

OTHER PUBLICATIONS

Paschotta, "Volume Bragg Gratings", retrieved from the internet Aug. 27, 2019, pp. 1-7, RP Photonics Consulting GmbH.

* cited by examiner

*Primary Examiner* — Michael P LaPage
(74) *Attorney, Agent, or Firm* — Fogg & Powers LLC (57) ABSTRACT

A ring laser gyroscope comprises an optical block that defines an optical closed loop pathway; at least one mirror structure mounted on the optical block and in communication with the closed loop pathway; at least one volume Bragg grating mounted on the optical block and in communication with the closed loop pathway; and a pump laser in communication with the volume Bragg grating, the laser operative to emit a light beam at a selected incident angle such that the beam passes through the volume Bragg grating and overlaps with the closed loop pathway. The volume Bragg grating is operative as a gain medium to increase an optical power of the beam, and a pair of counter-propagating beams is produced within the closed loop pathway from the beam. The mirror structure and the volume Bragg grating are positioned and angled to reflect the counter-propagating beams around the closed loop pathway.

20 Claims, 7 Drawing Sheets

RING LASER GYROSCOPES WITH ACTIVE VOLUME BRAGG GRATING

BACKGROUND

Ring laser gyroscopes, such the helium-neon (He—Ne) ring laser gyroscope, have been used in many navigation systems over the years. The He—Ne ring laser gyroscope uses He—Ne gas as a gain medium to generate bidirectional lasers to detect the Sagnac phase shift due to rotation. The gaseous nature of the gain medium requires complicated processing techniques and has a limited lifetime due to gas leakage.

Thus, there is a need for a solid-state material for use as a gain medium in ring laser gyroscopes, which would provide a longer lifetime and eliminate some of the expansive fixtures designed for gas lasing in ring laser gyroscopes.

SUMMARY

A ring laser gyroscope comprises an optical block that defines an optical closed loop pathway; at least one mirror structure mounted on the optical block and in optical communication with the optical closed loop pathway; at least one volume Bragg grating mounted on the optical block and in optical communication with the optical closed loop pathway; and a pump laser in optical communication with the volume Bragg grating, the pump laser operative to emit a light beam at a selected incident angle such that the light beam passes through the volume Bragg grating and overlaps with the optical closed loop pathway. The volume Bragg grating is operative as a gain medium to increase an optical power of the light beam, and a pair of counter-propagating light beams is produced within the optical closed loop pathway from the light beam. The mirror structure and the volume Bragg grating are positioned and appropriately angled to reflect the counter-propagating light beams around the optical closed loop pathway.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of ring laser gyroscopes, which are implemented with active volume Bragg gratings, are described herein. In various embodiments, at least one high reflective mirror in a ring laser gyroscope is replaced with an active volume Bragg grating that is made of with a solid-state material. The volume Bragg grating can be used as both a gain medium and a high reflector in a cavity of the ring laser gyroscope.

A volume Bragg grating is different from traditional diffraction gratings in that the grating structure of a volume Bragg grating is written into the interior of a bulk glass material, instead of being written on a surface of the glass material like traditional diffraction gratings. The volume Bragg grating is operative to allow a light beam to penetrate into the bulk glass material, and then to be reflected or transmitted by the grating structure within the bulk glass material. While the light beam is reflected or transmitted by the grating structure in the volume Bragg grating, the light beam is also amplified as well since the volume Bragg grating acts as a gain medium.

Rare-earth doped glass materials can be used for fabrication of the volume Bragg gratings described herein. In various embodiments, the volume Bragg grating can be a few to hundreds of microns in thickness. The volume Bragg grating is attached to an optical block of the ring laser gyroscope directly to replace a mirror or an output coupler. Use of the volume Bragg grating in such a manner can reduce the assembling time and cost of ring laser gyroscopes.

Further details of various embodiments are described hereafter with reference to the drawings.

Figure 1:
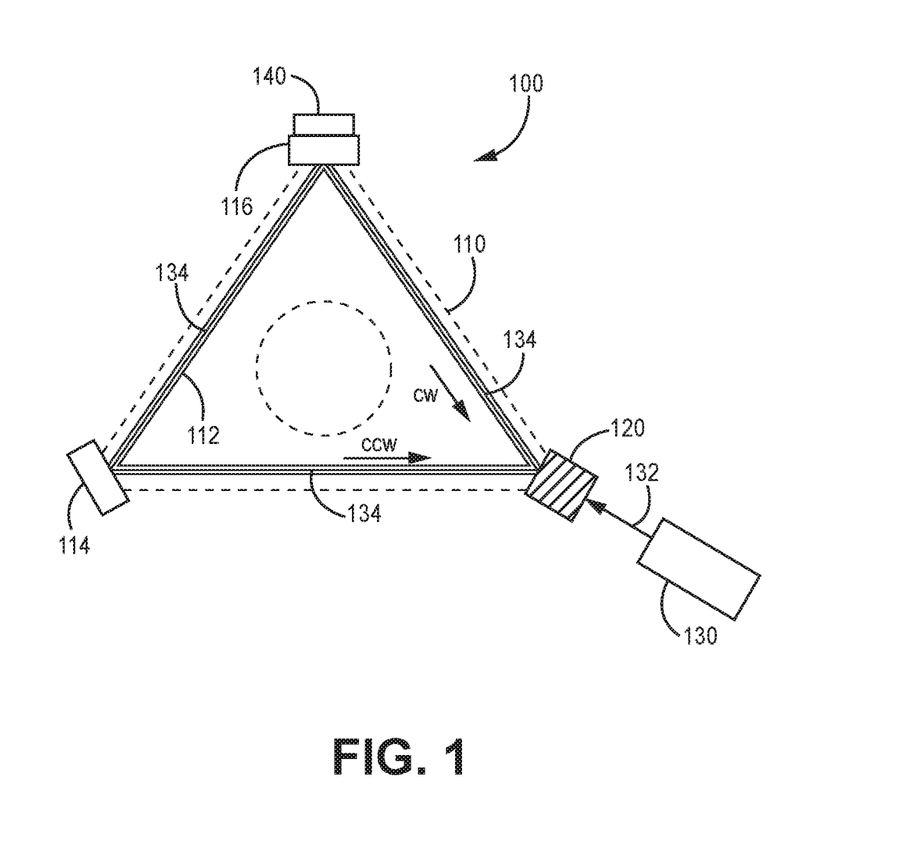
FIG. 1 is a schematic illustration of a ring laser gyroscope, according to one embodiment, which is implemented with an active volume Bragg grating.

FIG. 1 illustrates a ring laser gyroscope (RLG) 100, according to one embodiment, which is implemented with an active volume Bragg grating (VBG) 120. The RLG 100 includes an optical block 110 having a resonant cavity in the form of an optical closed loop pathway 112, which has a substantially triangular shape. A pair of mirror structures 114, 116 are respectively mounted on optical block 110 at first and second corners of closed loop pathway 112. The VBG 120 is mounted at a third corner of, and is in optical communication with, closed loop pathway 112. The mirror structures 114, 116 are positioned and appropriately angled, along with VBG 120, to reflect light around closed loop pathway 112.

A pump laser 130, such as a semiconductor laser, is configured to emit a light beam 132 at a selected incident angle such that light beam 132 passes through VBG 120 and overlaps with closed loop pathway 112 in VBG 120. The VBG 120 is operative to act as a gain medium, which is used to increase the optical power of the light beam within closed loop pathway 112, and a pair of counter-propagating light beams 134 is produced within closed loop pathway 112. The counter-propagating light beams 134 travel within the cavity of closed loop pathway 112 in opposite directions by reflection from mirror structures 114, 116 and VBG 120, such as in clockwise (CW) and counterclockwise (CCW) directions.

The optical block 110 may be composed of a transparent material such as a glass material. The mirror structures 114, 116 may each be, for example, a metallic mirror, a dielectric mirror with multi-layer coatings, or the like.

The VBG 120 can be composed of a rare-earth doped glass material, such as a neodymium (Nd) doped glass, ytterbium (Yb) doped glass, erbium (Er) doped glass, and the like. The VBG 120 can be written by direct laser scribing or by ultra-violet (UV) interference, for example. The VBG 120 can be formed to function as both a gain medium and a reflection device for the light beam emitted by pump laser 130.

A photodetector device 140 is in optical communication with one of the mirror structures such as mirror structure 116, which acts as an optical coupler, such that a portion of the light beams from closed loop pathway 112 is coupled out to photodetector device 140. In this embodiment, a reflective surface of mirror structure 116 is partially optically transmissive, which allows a portion of the counter-propagating light beams 134 in closed loop pathway 112 to pass therethrough to photodetector device 140.

During operation, the rotation of RLG 100 causes the effective path length of the counter-propagating light beams to change in closed loop pathway 112, thereby producing a frequency difference between the counter-propagating light beams. The frequency difference produces an interference pattern, which is detected by photodetector 140. A corresponding output signal from photodetector 140 is then sent to a processor to determine an angular rate of rotation for RLG 100.

Figure 2A:
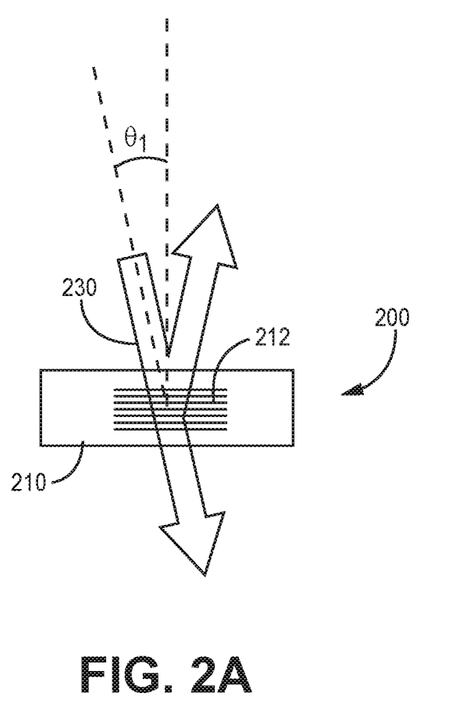
FIGS. 2A and 2B are schematic illustrations of a volume Bragg grating, according to one embodiment, which can be implemented in a ring laser gyroscope.
Figure 2B:
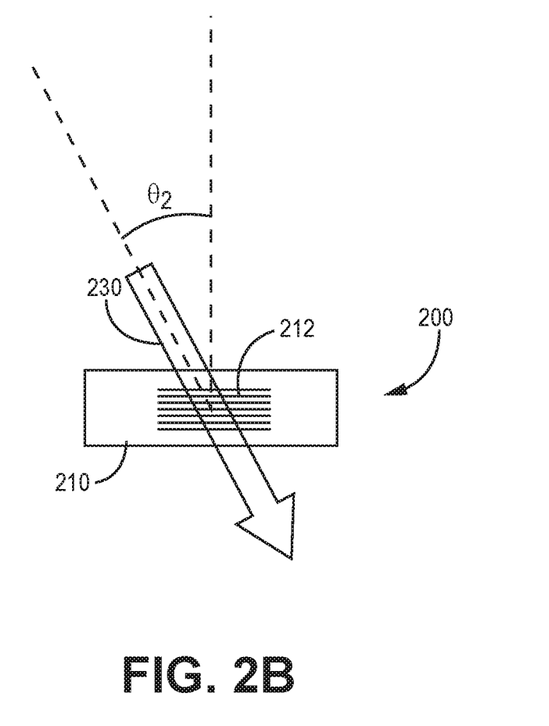

FIGS. 2A and 2B illustrate further detail of a VBG 200, which is similar to VBG 120 implemented in RLG 100 as a gain medium and reflection device. The VBG 200 includes a glass block 210, such as a rare-earth doped glass block, and a grating structure 212 that is written into an interior portion of glass block 210.

As shown in FIG. 2A, grating structure 212 is configured to reflect an incident beam 230, if the Bragg condition is met for a given angle of incidence ($\theta_1$). As depicted in FIG. 2B, for a different angle of incidence ($\theta_2$), hardly any reflection occurs at grating structure 212, and incident beam 230 will pass through VBG 200. These features of VBG 200 (and VBG 120) allow such VBGs to function as both a gain medium and a reflection device in a ring laser gyroscope.

Figure 3:
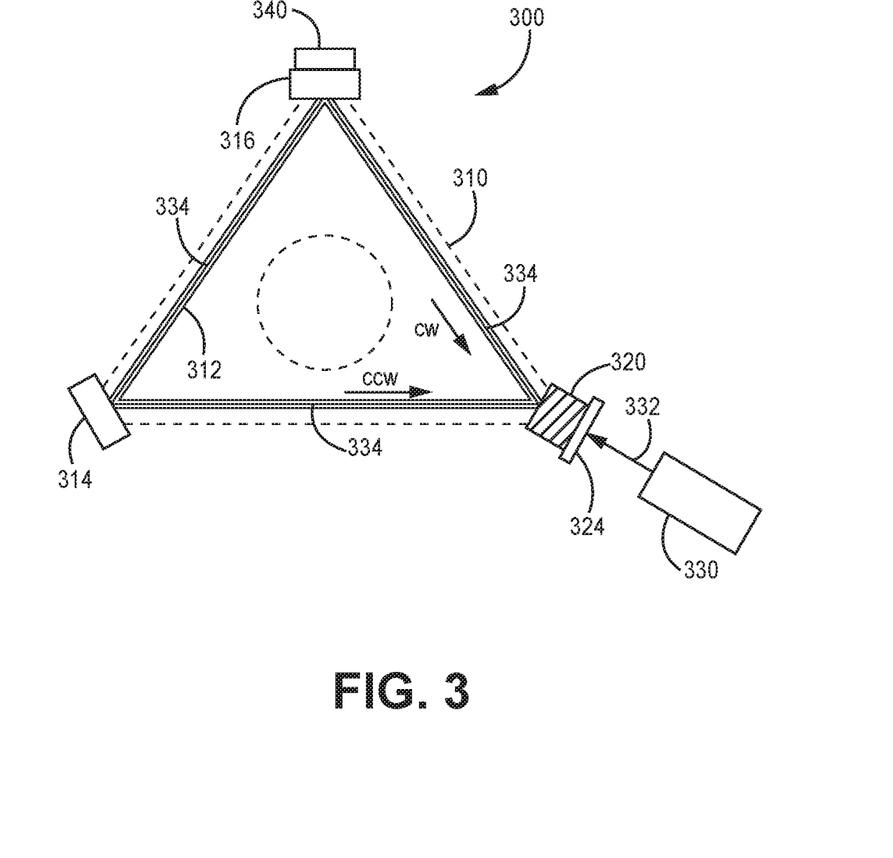
FIG. 3 is a schematic illustration of a ring laser gyroscope, according to another embodiment, which is implemented with an active volume Bragg grating.

FIG. 3 illustrates a ring laser gyroscope (RLG) 300, according to another embodiment, which is implemented with an active volume Bragg grating (VBG) 320. The RLG 300 includes an optical block 310 having a resonant cavity in the form of an optical closed loop pathway 312, which has a substantially triangular shape. A pair of mirror structures 314, 316 are respectively mounted on optical block 310 at two corners of closed loop pathway 312. The VBG 320 is mounted at a third corner of, and is in optical communication with, closed loop pathway 312. The mirror structures 314, 316 are positioned and appropriately angled, along with VBG 320, to reflect light around closed loop pathway 312.

As shown in FIG. 3, RLG 300 also includes a piezoelectric device 324, which is coupled to one end of VBG 320. The piezoelectric device 324 can be composed of a piezoelectric ceramic material, such as lead zirconate titanate (PZT).

A pump laser 330, such as a semiconductor laser, is configured to emit a light beam 332 at a selected incident angle such that light beam 332 passes through VBG 320 and overlaps with closed loop pathway 312 in VBG 320. The VBG 320 is operative to act as a gain medium, which is used to increase the optical power of the light beam within closed loop pathway 312, and a pair of counter-propagating light beams 334 is produced within closed loop pathway 312. The counter-propagating light beams 334 travel within the cavity of closed loop pathway 312 in opposite directions by reflection from mirror structures 314, 316, and VBG 320, such as in CW and CCW directions.

A photodetector device 340 is in optical communication with one of the mirror structures such as mirror structure 316, which acts as an optical coupler, such that a portion of the light beams from closed loop pathway 312 is coupled out to photodetector device 340. In this embodiment, a reflective surface of mirror structure 316 is partially optically transmissive, which allows a portion of the counter-propagating light beams 334 in closed loop pathway 312 to pass therethrough to photodetector device 340.

The piezoelectric device 324 is configured to provide cavity length control to adjust the power of the light beams in closed loop pathway 312. By adding another piezoelectric device (e PZT) on either mirror structure 314 or mirror structure (coupler) 316, piezoelectric device 324 can be implemented to function in a push-pull mode on VBG 320 in order to reduce the gain-grating effect while still maintaining the cavity length of closed loop pathway 312.

During operation, an angular rate of rotation for RLG 300 is determined in a similar manner as described above for RLG 100.

While the ring laser gyroscopes shown in FIGS. 1 and 3 have a triangular configuration, in other embodiments, the ring laser gyroscopes may have a square configuration, a rectangular configuration, a pentagonal configuration, a hexagonal configuration, or any other polygon configuration that includes an optical closed loop pathway.

Figure 4:
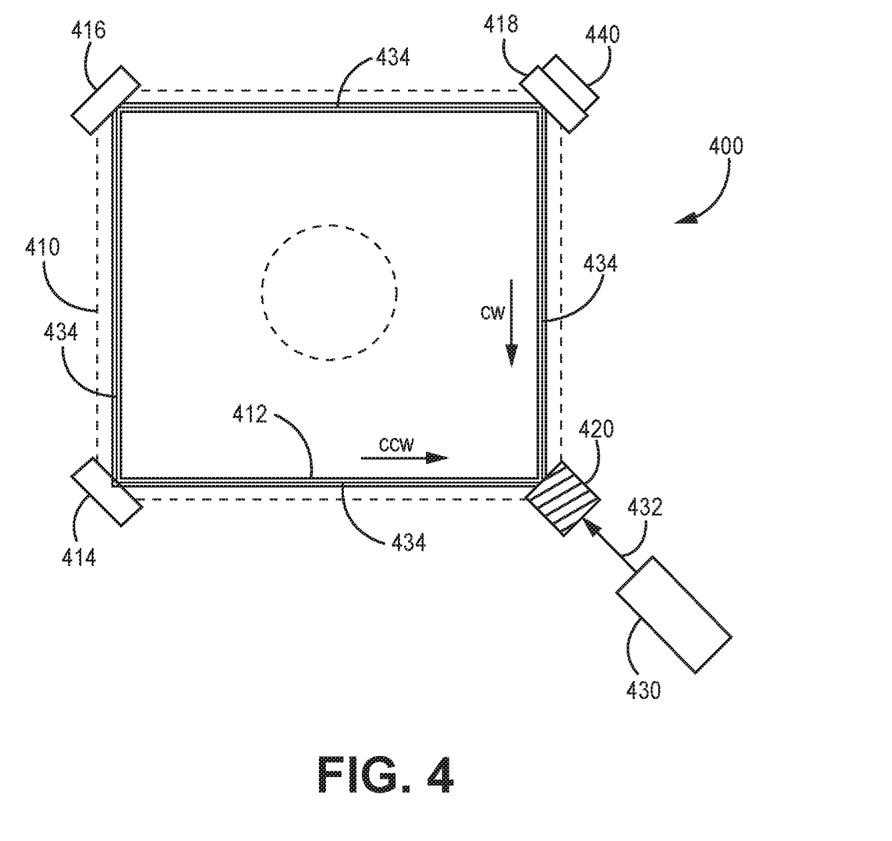
FIG. 4 is a schematic illustration of a ring a ring laser gyroscope, according to an alternative embodiment, which is implemented with an active volume Bragg grating.

For example, FIG. 4 illustrates a ring laser gyroscope (RLG) 400, according to an alternative embodiment, which has a substantially rectangular (e.g., square) shape and is implemented with an active volume Bragg grating (VBG) 420. The RLG 400 includes an optical block 410 having a resonant cavity in the form of an optical closed loop pathway 412. A set of mirror structures 414, 416, and 418 are respectively mounted on optical block 410 at first, second, and third corners of closed loop pathway 412. The VBG 420 is mounted at a fourth corner of, and is in optical communication with, closed loop pathway 412. The mirror structures 414, 416, 418 are positioned and appropriately angled, along with VBG 420, to reflect light around closed loop pathway 412.

A pump laser 430, such as a semiconductor laser, is configured to emit a light beam 432 at a selected incident angle such that light beam 432 passes through VBG 420 and overlaps with closed loop pathway 412 in VBG 420. The VBG 420 is operative to act as a gain medium, which is used to increase the optical power of the light beam within closed loop pathway 412, and a pair of counter-propagating light beams 434 is produced within closed loop pathway 412. The counter-propagating light beams 434 travel within the cavity of closed loop pathway 312 in opposite directions by reflection from mirror structures 414, 416, 418, and VBG 420, such as in CW and CCW directions.

A photodetector device 440 is in optical communication with one of the mirror structures such as mirror structure 418, which acts as an optical coupler, such that a portion of the light beams from closed loop pathway 412 is coupled out to photodetector device 440. In this embodiment, a reflective surface of mirror structure 418 is partially optically transmissive, which allows a portion of the counter-propagating light beams 434 in closed loop pathway 412 to pass therethrough to photodetector device 440.

During operation, an angular rate of rotation for RLG 400 is determined in a similar manner as described above for RLG 100.

While the ring laser gyroscopes shown in FIGS. 1, 3, and 4 utilize a single volume Bragg grating, in other embodiments, ring laser gyroscopes may constructed that use multiple volume Bragg gratings. Examples of such embodiments are described as follows.

Figure 5:
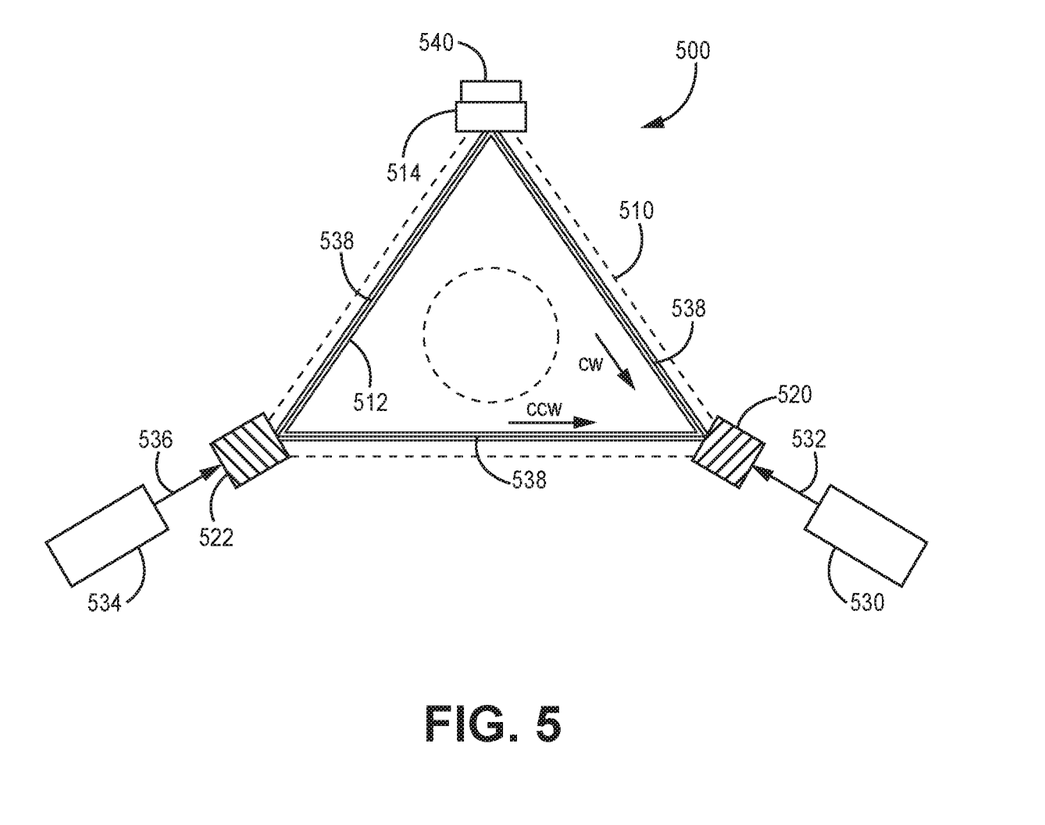
FIG. 5 is a schematic illustration of a ring laser gyroscope, according to another embodiment, which is implemented with multiple active volume Bragg gratings.

FIG. 5 illustrates a ring laser gyroscope (RLG) 500, which is implemented with multiple active volume Bragg gratings (VBGs), according to one embodiment. The RLG 500 includes an optical block 510 having a resonant cavity in the form of an optical closed loop pathway 512, which has a substantially triangular shape. A mirror structure 514 is mounted on optical block 510 at one corner of closed loop pathway 512. A pair of VBGs 520, 522 are respectively mounted at the other corners of, and are in optical communication with, closed loop pathway 512. The mirror structure 514 is positioned and appropriately angled, along with VBGs 520, 522 to reflect light around closed loop pathway 512.

A first pump laser 530 is configured to emit a first pump light beam 532 at a selected incident angle such that light beam 532 passes through VBG 520 and overlaps with closed loop pathway 512 in VBG 520. A second pump laser 534 is configured to emit a second pump light beam 536 at a selected incident angle such that light beam 536 passes through VBG 522 and overlaps with closed loop pathway 512 in VBG 522.

The VBGs 520, 522 are operative to act as gain mediums to increase the optical power of the light beams within closed loop pathway 512, and a pair of counter-propagating light beams 538 is produced within closed loop pathway 512. The counter-propagating light beams 538 travel within the cavity of closed loop pathway 512 in opposite directions by reflection from mirror structure 514 and VBGs 520, 522, such as in CW and CCW directions.

A photodetector device 540 is in optical communication with mirror structure 514, which acts as an optical coupler, such that a portion of the light beams from closed loop pathway 512 is coupled out to photodetector device 540. In this embodiment, a reflective surface of mirror structure 514 is partially optically transmissive, which allows a portion of the counter-propagating light beams 538 in closed loop pathway 512 to pass therethrough to photodetector device 540.

During operation, an angular rate of rotation for RLG 500 is determined in a similar manner as described above for RLG 100.

Figure 6:
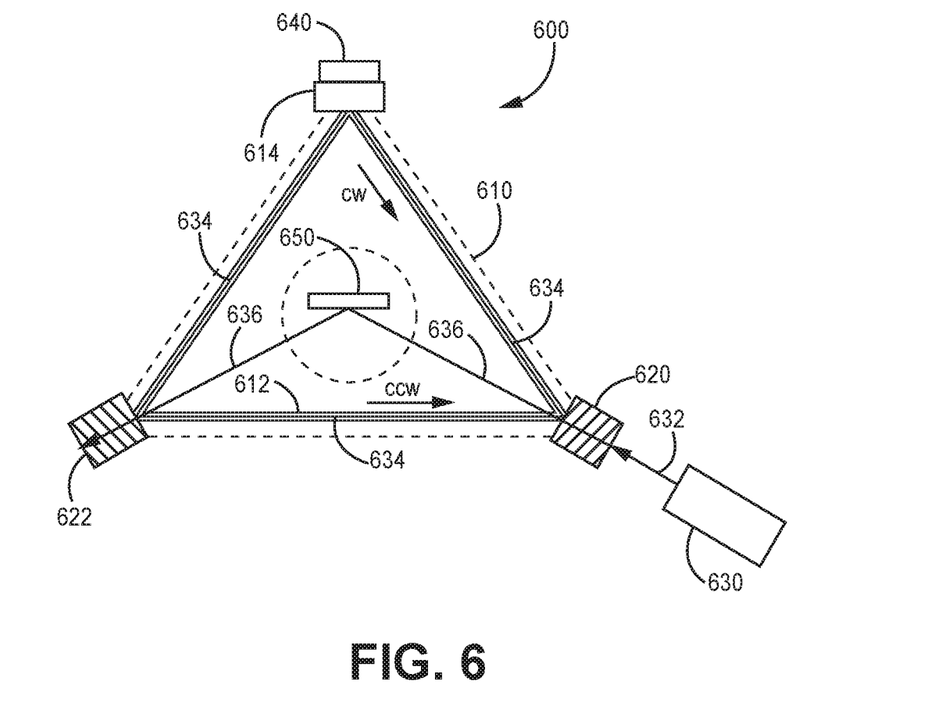
FIG. 6 is a schematic illustration of a ring laser gyroscope, which is implemented with multiple active volume Bragg gratings, according to an alternative embodiment.

FIG. 6 illustrates a ring laser gyroscope (RLG) 600, which is implemented with multiple active volume Bragg gratings (VBGs), according to an alternative embodiment. The RLG 600 includes an optical block 610 having a resonant cavity in the form of an optical closed loop pathway 612. A mirror structure 614 is mounted on optical block 610 at one corner of closed loop pathway 612. A pair of VBGs 620, 622 are respectively mounted at the other corners of, and are in optical communication with, closed loop pathway 612. The mirror structure 614 is positioned and appropriately angled, along with VBGs 620, 622 to reflect light around closed loop pathway 612.

A pump laser 630 is configured to emit a pump light beam 632 at a selected incident angle such that light beam 632 passes through VBG 620 and overlaps with closed loop pathway 612 in VBG 620. The VBG 620 is operative to act as a gain medium, which is used to increase the optical power of the light beam within closed loop pathway 612, and a pair of counter-propagating light beams 634 is produced within closed loop pathway 612. The counter-propagating light beams 634 travel within the cavity of closed loop pathway 612 in opposite directions by reflection from mirror structure 614 and VBGs 620, 622, such as in CW and CCW directions.

A photodetector device 640 is in optical communication with mirror structure 614, which acts as an optical coupler, such that a portion of the light beams from closed loop pathway 612 is coupled out to photodetector device 640. In this embodiment, a reflective surface of mirror structure 614 is partially optically transmissive, which allows a portion of the counter-propagating light beams 634 in closed loop pathway 612 to pass therethrough to photodetector device 640.

In addition, RLG 600 includes a pump mirror 650 located within optical block 610. The mirror 650 is configured to reflect residual light 636 from a portion of pump light beam 632 that passes through VBG 620. The residual light 636 is reflected by pump mirror 650 to VBG 622, which is configured to pass residual light 636 therethrough for recycling during operation of RLG 600.

Figure 7:
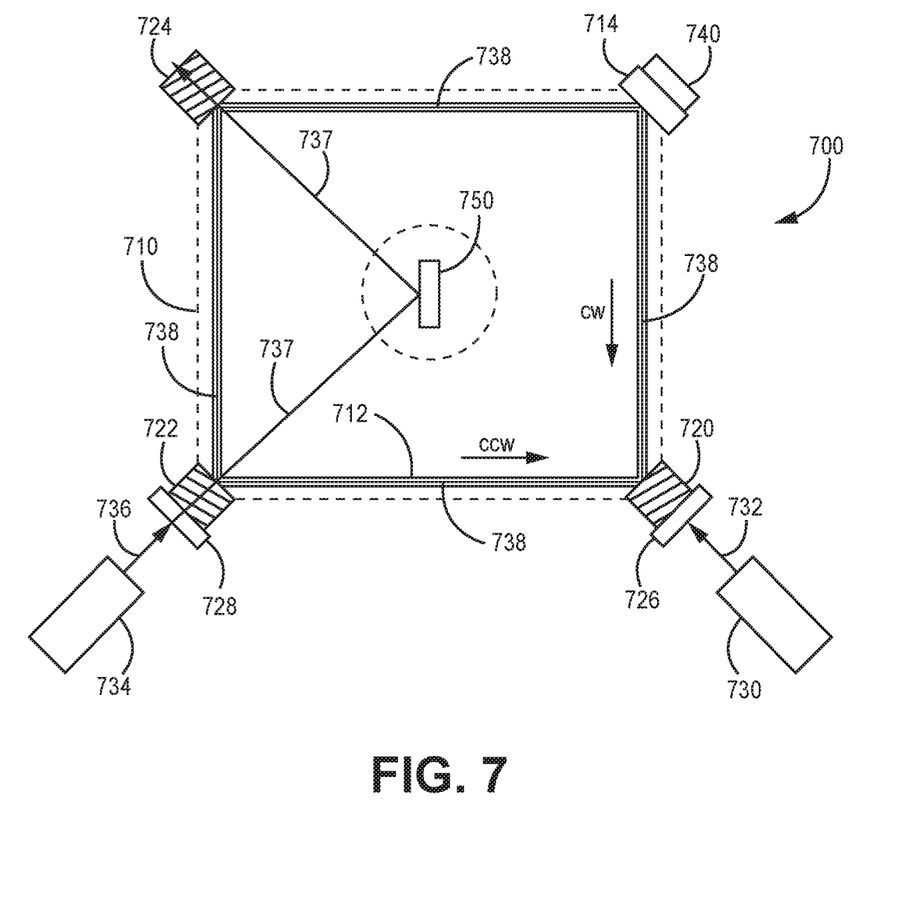
FIG. 7 is a schematic illustration of a ring laser gyroscope, which is implemented with multiple active volume Bragg gratings, according to a further embodiment.

FIG. 7 depicts a ring laser gyroscope (RLG) 700, according to a further embodiment, which is implemented with multiple active volume Bragg gratings (VBGs). The RLG 700 includes an optical block 710 having a resonant cavity in the form of an optical closed loop pathway 712, which has a substantially rectangular shape. A mirror structure 714 is mounted on optical block 710 at one corner of closed loop pathway 712. A set of VBGs 720, 722, 724 are respectively mounted at the other corners of, and are in optical communication with, closed loop pathway 712. The mirror structure 714 and VBGs 720, 722, 724 are positioned and appropriately angled to reflect light around closed loop pathway 712

As shown in FIG. 7, RLG 700 also includes a pair of piezoelectric devices 726, 728 which are coupled to respective ends of VBGs 620, 622. The piezoelectric devices 726, 728 can be composed of PZT, for example.

A first pump laser 730 is configured to emit a first pump light beam 732 at a selected incident angle such that light beam 732 passes through VBG 720 and overlaps with closed loop pathway 712 in VBG 720. A second pump laser 734 is configured to emit a second pump light beam 736 at a selected incident angle such that light beam 736 passes through VBG 722 and overlaps with closed loop pathway 712 in VBG 722.

The VBGs 720, 722 are operative to act as gain mediums to increase the optical power of the light beams within closed loop pathway 712, and a pair of counter-propagating light beams 738 is produced within closed loop pathway 712. The counter-propagating light beams 738 travel within the cavity of closed loop pathway 712 in opposite directions by reflection from mirror structure 714 and VBGs 720, 722, 724, such as in CW and CCW directions.

A photodetector device 740 is in optical communication with mirror structure 714, which acts as an optical coupler, such that a portion of the light beams from closed loop pathway 712 is coupled out to photodetector device 740. In this embodiment, a reflective surface of mirror structure 714 is partially optically transmissive, which allows a portion of the counter-propagating light beams 738 in closed loop pathway 712 to pass therethrough to photodetector device 740.

The piezoelectric devices 726, 728 are configured to provide cavity length control to adjust the power of pump lasers 730, 734. The piezoelectric devices 726, 728 can be implemented to function in a push-pull mode on VBGs 720, 722 in order to reduce the gain-grating effect while still maintaining the cavity length during operation of RLG 700.

Optionally, RLG 700 can include a pump mirror 750 located within optical block 710. The pump mirror 750 is configured to reflect residual light, such as residual light 737 from a portion of pump light beam 736 that passes through VBG 722. The residual light 737 is reflected by pump mirror 750 to VBG 724, which is configured to pass residual light 737 therethrough for recycling during operation of RLG 700. In another implementation, pump mirror 750 can be configured to direct residual light from a portion of pump light beam 732 that passes through VBG 720, such that this residual light is sent to VBG 724 for recycling.

EXAMPLE EMBODIMENTS

Example 1 includes a ring laser gyroscope, comprising: an optical block that defines an optical closed loop pathway; at least one mirror structure mounted on the optical block and in optical communication with the optical closed loop pathway; at least one volume Bragg grating mounted on the optical block and in optical communication with the optical closed loop pathway; and a first pump laser in optical communication with the volume Bragg grating, the first pump laser operative to emit a light beam at a selected incident angle such that the light beam passes through the volume Bragg grating and overlaps with the optical closed loop pathway; wherein the volume Bragg grating is operative as a gain medium to increase an optical power of the light beam; wherein a pair of counter-propagating light beams is produced within the optical closed loop pathway from the light beam; wherein the mirror structure and the volume Bragg grating are positioned and appropriately angled to reflect the counter-propagating light beams around the optical closed loop pathway.

Example 2 includes the ring laser gyroscope of Example 1, wherein the volume Bragg grating comprises a rare-earth doped glass.

Example 3 includes the ring laser gyroscope of any of Examples 1-2, wherein the volume Bragg grating comprises a neodymium (Nd) doped glass, a ytterbium (Yb) doped glass, or an erbium (Er) doped glass.

Example 4 includes the ring laser gyroscope of any of Examples 1-3, wherein the volume Bragg grating is written by direct laser scribing, or by ultra-violet (UV) interference.

Example 5 includes the ring laser gyroscope of any of Examples 1-4, further comprising a first piezoelectric device coupled to the volume Bragg grating.

Example 6 includes the ring laser gyroscope of Example 5, wherein the first piezoelectric device comprises lead zirconate titanate.

Example 7 includes the ring laser gyroscope of any of Examples 5-6, wherein the first piezoelectric device is configured to provide cavity length control of the optical closed loop pathway to adjust the optical power of the light beam.

Example 8 includes the ring laser gyroscope of any of Examples 5-7, further comprising a second piezoelectric device coupled to the mirror structure.

Example 9 includes the ring laser gyroscope of Example 8, wherein the first piezoelectric device is operative to function in a push-pull mode on the volume Bragg grating to reduce a gain-grating effect while still maintaining a cavity length of the optical closed loop pathway.

Example 10 includes the ring laser gyroscope of any of Examples 1-9, wherein the mirror structure comprises a metallic mirror, or a dielectric mirror with multi-layer coatings.

Example 11 includes the ring laser gyroscope of any of Examples 1-10, wherein the pump laser comprises a semiconductor laser.

Example 12 includes the ring laser gyroscope of any of Examples 1-11, further comprising a photodetector device in optical communication with the mirror structure, which acts as an optical coupler, such that a portion of the light beams from the optical closed loop pathway is coupled out to the photodetector device.

Example 13 includes the ring laser gyroscope of any of Examples 1-12, wherein the optical closed loop pathway has a substantially triangular shape.

Example 14 includes the ring laser gyroscope of Example 13, wherein the at least one mirror structure comprises a pair of mirror structures respectively mounted on the optical block at first and second corners of the optical closed loop pathway; and the volume Bragg grating is mounted at a third corner of the optical closed loop pathway.

Example 15 includes the ring laser gyroscope of Example 14, further comprising a piezoelectric device coupled to the volume Bragg grating.

Example 16 includes the ring laser gyroscope of Example 13, wherein the mirror structure is mounted on the optical block at a first corner of the optical closed loop pathway; the at least one volume Bragg grating comprises a first volume Bragg grating mounted at a second corner, and a second volume Bragg grating mounted at a third corner, of the optical closed loop pathway; the first pump laser is in optical communication with the first volume Bragg grating; and a second pump laser in optical communication with the second volume Bragg grating.

Example 17 includes the ring laser gyroscope of Example 13, wherein the mirror structure is mounted on the optical block at a first corner of the optical closed loop pathway; the at least one volume Bragg grating comprises a first volume Bragg grating mounted at a second corner, and a second volume Bragg grating mounted at a third corner, of the optical closed loop pathway; the first pump laser is in optical communication with the first volume Bragg grating; and wherein the ring laser gyroscope further comprises a pump mirror in the optical block and configured to reflect residual light from a portion of the light beam that passes through the first volume Bragg grating, the residual light reflected by the pump mirror to the second volume Bragg grating, which is configured to pass the residual light therethrough for recycling during operation of the ring laser gyroscope.

Example 18 includes the ring laser gyroscope of any of Examples 1-12, wherein the optical closed loop pathway has a substantially rectangular shape.

Example 19 includes the ring laser gyroscope of Example 18, wherein the at least one mirror structure comprises a set of three mirror structures respectively mounted on the optical block at a first corner, a second corner, and a third corner, of the optical closed loop pathway; and the volume Bragg grating is mounted at a fourth corner of the optical closed loop pathway.

Example 20 includes the ring laser gyroscope of Example 18, wherein the mirror structure is mounted on the optical block at a first corner of the optical closed loop pathway; the at least one volume Bragg grating comprises a first volume Bragg grating mounted at a second corner, a second volume Bragg grating mounted at a third corner, and a third volume Bragg grating mounted at a fourth corner, of the optical closed loop pathway; the first pump laser is in optical communication with the first volume Bragg grating; and a second pump laser in optical communication with the second volume Bragg grating; wherein a first piezoelectric device is coupled to the first volume Bragg grating, and a second piezoelectric device is coupled to the second volume Bragg grating.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A ring laser gyroscope, comprising:
   an optical block that defines an optical closed loop pathway;
   at least one mirror structure mounted on the optical block and in optical communication with the optical closed loop pathway;
   at least one volume Bragg grating mounted on the optical block and in optical communication with the optical closed loop pathway; and
   a first pump laser in optical communication with the volume Bragg grating, the first pump laser operative to emit a light beam at a selected incident angle such that the light beam passes through the volume Bragg grating and overlaps with the optical closed loop pathway;
   wherein the volume Bragg grating comprises a doped glass and is operative as a gain medium to increase an optical power of the light beam;
   wherein a pair of counter-propagating light beams is produced within the optical closed loop pathway from the light beam;
   wherein the mirror structure and the volume Bragg grating are positioned and appropriately angled to reflect the counter-propagating light beams around the optical closed loop pathway.

2. The ring laser gyroscope of claim 1, wherein the volume Bragg grating comprises a rare-earth doped glass.

3. The ring laser gyroscope of claim 1, wherein the volume Bragg grating comprises a neodymium (Nd) doped glass, a ytterbium (Yb) doped glass, or an erbium (Er) doped glass.

4. The ring laser gyroscope of claim 1, wherein the volume Bragg grating is written by direct laser scribing, or by ultra-violet (UV) interference.

5. The ring laser gyroscope of claim 1, further comprising a first piezoelectric device coupled to the volume Bragg grating.

6. The ring laser gyroscope of claim 5, wherein the first piezoelectric device comprises lead zirconate titanate.

7. The ring laser gyroscope of claim 5, wherein the first piezoelectric device is configured to provide cavity length control of the optical closed loop pathway to adjust the optical power of the light beam.

8. The ring laser gyroscope of claim 5, further comprising a second iezoelectric device coupled to the mirror structure.

9. The ring laser gyroscope of claim 8, wherein the first piezoelectric device is operative to function in a push-pull mode on the volume Bragg grating to reduce a gain-grating effect while still maintaining a cavity length of the optical closed loop pathway.

10. The ring laser gyroscope of claim 1, wherein the mirror structure comprises a metallic mirror, or a dielectric mirror with multi-layer coatings.

11. The ring laser gyroscope of claim 1, wherein the pump laser comprises a semiconductor laser.

12. The ring laser gyroscope of claim 1, further comprising a photodetector device in optical communication with the mirror structure, which acts as an optical coupler, such that a portion of the light beams from the optical closed loop pathway is coupled out to the photodetector device.

13. The ring laser gyroscope of claim 1, wherein the optical closed loop pathway has a substantially triangular shape.

14. The ring laser gyroscope of claim 13, wherein:
   the at least one mirror structure comprises a pair of mirror structures respectively mounted on the optical block at first and second corners of the optical closed loop pathway; and
   the volume Bragg grating is mounted at a third corner of the optical closed loop pathway.

15. The ring laser gyroscope of claim 14, further comprising a piezoelectric device coupled to the volume Bragg grating.

16. The ring laser gyroscope of claim 13, wherein:
   the mirror structure is mounted on the optical block at a first corner of the optical closed loop pathway;
   the at least one volume Bragg grating comprises a first volume Bragg grating mounted at a second corner, and a second volume Bragg grating mounted at a third corner, of the optical closed loop pathway;
   the first pump laser is in optical communication with the first volume Bragg grating; and
   a second pump laser in optical communication with the second volume Bragg grating.

17. The ring laser gyroscope of claim 13, wherein:
   the mirror structure is mounted on the optical block at a first corner of the optical closed loop pathway;
   the at least one volume Bragg grating comprises a first volume Bragg grating mounted at a second corner, and a second volume Bragg grating mounted at a third corner, of the optical closed loop pathway;
   the first pump laser is in optical communication with the first volume Bragg grating; and
   wherein the ring laser gyroscope further comprises:
      a pump mirror in the optical block and configured to reflect residual light from a portion of the light beam that passes through the first volume Bragg grating, the residual light reflected by the pump mirror to the second volume Bragg grating, which is configured to pass the residual light therethrough for recycling during operation of the ring laser gyroscope.

18. The ring laser gyroscope of claim 1, wherein the optical closed loop pathway has a substantially rectangular shape.

19. The ring laser gyroscope of claim 18, wherein:
   the at least one mirror structure comprises a set of three mirror structures respectively mounted on the optical block at a first corner, a second corner, and a third corner, of the optical closed loop pathway; and
   the volume Bragg grating is mounted at a fourth corner of the optical closed loop pathway.

20. The ring laser gyroscope of claim 18, wherein:
   the mirror structure is mounted on the optical block at a first corner of the optical closed loop pathway;
   the at least one volume Bragg grating comprises a first volume Bragg grating mounted at a second corner, a second volume Bragg grating mounted at a third corner, and a third volume Bragg grating mounted at a fourth corner, of the optical closed loop pathway;

the first pump laser is in optical communication with the first volume Bragg grating; and a second pump laser is in optical communication with the second volume Bragg grating;

wherein a first piezoelectric device is coupled to the first volume Bragg grating, and a second piezoelectric device is coupled to the second volume Bragg grating.

* * * * *